Nov. 21, 1961 W. B. GAUNT, JR 3,010,027

CONSTANT CURRENT PULSE GENERATOR

Filed Dec. 9, 1958

INVENTOR
W. B. GAUNT, JR.
BY S. E. Hollander
ATTORNEY 3,010,027
CONSTANT CURRENT PULSE GENERATOR
Wilmer B. Gaunt, Jr., Florham Park, N.J., assignor to Bell Telephone Laboratories, Incorporated, New York, N.Y., a corporation of New York
Filed Dec. 9, 1958, Ser. No. 779,253
18 Claims. (Cl. 307—39)

This invention relates to pulse generators and more particularly to pulse generators for providing constant current output pulses to a varying load impedance, such as a memory array having a plurality of magnetic cores.

Memory arrays employing magnetically permeable cores which display substantially rectangular hysteresis characteristics place stringent requirements upon the constancy of the current employed to effect the switching operation of the cores therein. These arrays comprise a plurality of core elements each having two states or conditions of magnetization generally known in the art as the "set" and "reset" conditions of magnetization. Windings are employed on the core elements to switch them from one state to the other by means of current or voltage applied thereto. It is well known that such a switching winding presents a high impedance to the passage of electrical current in switching a large amount of magnetic flux, as in changing the magnetic state of a core, while in switching a small amount of flux it presents little impedance.

In many magnetic core arrays, and specifically those for which the present invention is contemplated, one or a plurality of cores may be switching from one state to the other at the same time. For instance, a number of magnetic cores arranged in a coordinate array may have individually controlled input windings for placing information in the cores by setting the selected cores. The advance windings, on the other hand, those which interrogate the state of each core by placing all the cores of the array in the reset condition thereby producing output pulses from those cores previously set, may be serially connected by a single lead. If the total number of input signals varies from time to time, then the number of cores switched by the advance windings must also vary since the cores are switched in series unison by the single lead. As the number of cores being switched varies from time to time, the total load impedance presented by the array must also vary. If a constant voltage source is employed to switch such an array of varying impedance, it is apparent that the current and the voltage through each individual core winding vary inversely with the total load. If the current and voltage applied to a winding to switch a core vary, the switching time and various other switching factors, including the actual ability of the core to switch from state to state in a determined period, will vary. It is well known in the magnetic core art, however, that the switching factors are maintained constant if an accurate constant current drive is supplied.

The constancy requirements pertaining to switching current are even more stringent in a circuit employing coincident current pulsing than in the normal core switching situation. In such circuits a plurality of windings on a core must be energized coincidentally to effect a change in the magnetic state of that core. In some coincident pulsing circuits it has been found advantageous to employ two windings per core, each of which windings when pulsed normally carries about 75 percent of the "just switching" or minimum switching current. In such circuits, current in but a single advance winding connected to a core cannot switch that core, and two time-coincident currents tending to switch flux in the same direction are necessary. The requirements for constant current are more stringent in coincident current pulsing circuits because a variation from the expected current value through switching windings in either a positive or negative direction is likely to cause improper energization of cores. For instance, it is entirely possible, that if inadequate current pulses are used for switching, a supposedly selected core will not be switched, and, will, therefore, produce no output. On the other hand, too great a current in any one switching winding may select inappropriate cores. If, as assumed above, each of the current pulses required for coincident switching in the aforementioned circuits is approximately 75 percent of the "just switching" value, it is apparent that an increase or decrease in switching current of but one third from the expected value may occasion deleterious effects.

Certain conventional circuits utilized to provide constant current pulses to coincident-current pulse driven memory arrays or to other circuits requiring constant current pulses have heretofore comprised some form of resistance in series with the varying load and a voltage source. The series resistor, in one specific case, is of a value quite large with respect to any variations in the impedance of the load. Since the load variations are small with respect to the total impedance of the circuit, approximately constant current is furnished to the load impedance.

It is apparent, of course, that in this circuit there is an upper limit to the value of the series resistor which may be employed to maintain a constant current if circuit power loss is to be an important consideration. The resistor must, in such a case, have a resistance of approximately the same order of magnitude as the load impedance. In this circuit a problem is presented if load impedance variances approach or, in fact, surpass the value of the load itself and, thus, are of the same order of magnitude as the resistance of the series resistor. This is essentially the case, as previously illustrated, in many magnetic core memory arrays. For instance, in such an array it is quite possible that any number of cores from one to the total number may be switching at the same instant. Since non-switching cores present a negligible impedance, the load may vary from an original value equal to the impedance of a single core to an impedance of many times that value. If the load impedance varies in such a manner and the series resistor is of an order of magnitude comparable to an average value of the load impedance, it is apparent that the total impedance of the circuit is not approximately constant, and the circuit will not furnish a constant current pulse to the load.

It is, therefore, an object of this invention to provide a constant current pulse generator adaptable for use with coincident current pulsing systems.

It is a further object of this invention to provide a constant current pulse generator for use with magnetic core memory array loads wherein variances in load impedance of 100 percent or greater have little effect on the constancy of the current pulses provided by the generator.

A modification of the type of prior art circuit employing a large series resistor has also been exploited heretofore for obtaining constant current pulses. This modified circuit includes a voltage source and a transistor operated as an amplifier in series with the varying load. The transistor is biased in a manner to introduce a serial circuit impedance which functions in the same manner as the large series resistor of the aforementioned prior art circuit. If, then, the impedance of the transistor amplifier is large in comparison to load impedance changes, a relatively constant current will be realized at the load. Such a constant current transistor circuit, of course, has the same inherent limitation for large load impedance changes as the previous circuit. That is, when load impedance changes of 100 percent or greater occur, maintenance of constant current is impossible if the transistor impedance is of the same order of magnitude as the load impedance so that power loss is held to a reasonable value. In addition, with such a circuit, the constancy of current provided depends heavily on the individual characteristics of the transistor which differ from one transistor to the other and which change with age.

It is, therefore, another object of this invention to provide a constant current pulse generating circuit which is substantially unaffected in its ability to provide constant current pulses by the individual characteristics of the active elements employed therein.

An additional problem, encountered when a linearly operated transistor is utilized in series to provide constant current to a varying load, concerns the value of the load which may be driven. Because the transistor is basically a low-voltage device, only a restricted voltage may be applied thereto. But if constant current is to be delivered to a varying load, the impedance of the transistor, as mentioned heretofore, must be of the same order of magnitude as the load impedance or greater. If the transistor impedance is of the same order as the load impedance, then the transistor voltage drop must be of the same order as the load voltage. Thus, the total circuit voltage and the load voltage and impedance are restricted by a transistor which can handle only a small voltage.

It is, therefore, another object of this invention to provide an improved constant current generator for driving magnetic core arrays wherein the impedance of the array is not limited by the characteristics of the active elements of the generator.

Briefly, these objects are accomplished in accordance with aspects of this invention by circuits which provide a compensating voltage in series with the load impedance at all times approximately equal and opposite to the voltage thereacross. The circuits include a voltage source, a large resistor in series with the source and the varying load, pulsing means for connecting the source to the resistor and the load periodically, and a series control comprising a transformer having a secondary winding connected in series with the voltage source, the resistor and the varying load. Across the secondary winding is maintained a voltage approximately equal but opposite in polarity to the voltage across the load impedance. By maintaining a voltage in series with the load, equal but of opposite polarity to the voltage thereacross, during the advent of a driving pulse, the total circuit impedance as viewed from the voltage source is, in effect, unvarying and the current remains constant through the circuit and the load.

To produce the opposition or "bucking" voltage across the transformer secondary winding, a transistor amplifier is utilized which has its input capacitively coupled to the aforementioned varying load and the secondary winding to monitor the voltage thereacross. The transistor amplifier has its output terminals connected to the primary winding of the transformer so that the output at the primary winding varies in response to changes in voltage across the load and the secondary winding. The primary and secondary windings of the transformer and thus, by feedback, the input and output of the amplifier are so associated that voltages induced in the secondary winding by the primary winding are equal and opposite to the voltages maintained across the load. The feedback from output to input is such that the voltage across the secondary winding will equal that across the load independent of individual variations in transistor characteristics.

Since the total potential difference across the load and the secondary winding remains at all times at approximately zero, the current to the load is maintained constant for very large changes in load impedance. As the transistor amplifier utilized to provide load compensation across the secondary winding is placed in parallel with the series circuit comprising the load, and the voltage delivered by the amplifier may be increased by adjusting the transformer turns ratio, the voltage which may be applied across the transistor has no relation to the value of the load impedance. Thus, magnetic core memory arrays comprising a large number of magnetic cores displaying substantially rectangular hysteresis characteristics may be driven by the generators of this invention with constant current pulse stabilization provided even though the switching load varies from one to a plurality of cores from pulse to pulse.

In one specific illustrative embodiment of the invention the constant current pulse generator is adapted to provide output pulses to two separate output loads. In this circuit, the compensating transformer is provided with three windings so connected that a single transistor amplifier circuit monitors the changes in the load voltages and provides voltages for compensating both loads. Transistor switches are arranged in this circuit in the individual output branches so that each load is operated independently and at a different time than the other load.

It is a feature of this invention that a transformer is utilized to provide a voltage in series with a varying load equal in value but opposite in polarity to voltages across the load so that constant current pulses are furnished at all times to a load impedance which varies from pulse to pulse.

A further feature of this invention pertains to the provision of a transistor amplifier to supply a voltage across a transformer secondary winding equal and opposite to a varying load voltage in series therewith whereby constant current is maintained to the load at all times.

Another feature of this invention relates to a feedback connection of the transistor amplifier whereby a voltage is maintained across a transformer secondary winding equal but opposite to the voltage across a load impedance in series therewith. The transistor amplifier has its base capacitively coupled to monitor the difference voltage across the varying load and the transformer secondary winding. The collector of the transistor is connected to the primary winding of the transformer so that changes in the aforementioned difference voltage occasion linear changes in the output of the transistor amplifier and thus in the voltage induced in the transformer secondary winding. The feedback from output to input of the amplifier maintains the transformer secondary voltage equal but opposite the load voltage for the duration of an input pulse.

These and other objects and features of this invention will be better understood upon consideration of the following detailed description and the accompanying drawing, in which.

Figure 3:
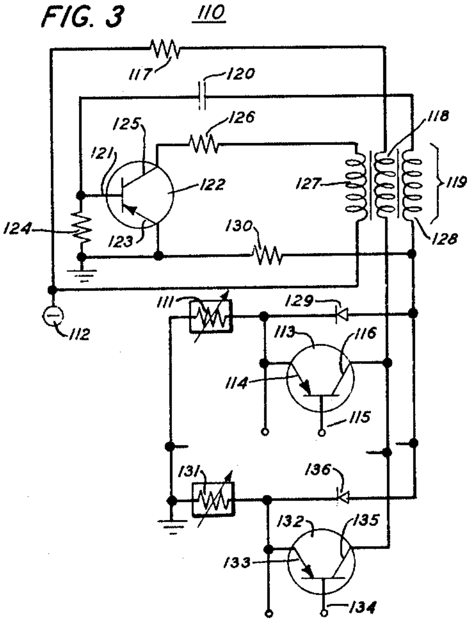
Figure 4:
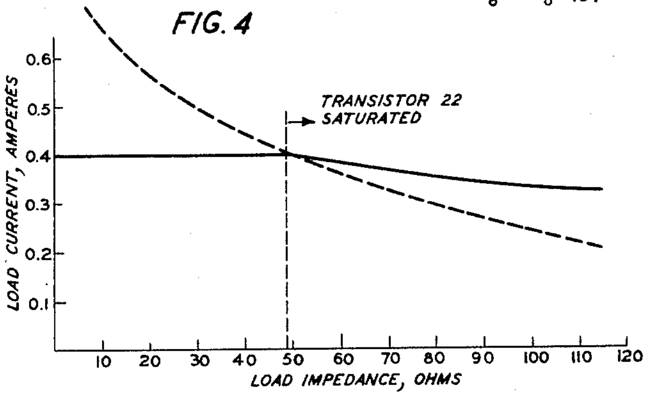

FIG. 3 is a schematic representation of a pulse generator circuit employing a transformer with two secondary windings and a single primary winding for furnishing constant current to a number of varying loads by means of but a single transistor feedback amplifier; and FIG. 4 is a diagram comparing the constancy of the current maintained in a circuit of this invention with that of the current maintained by prior art devices.

Figure 1:
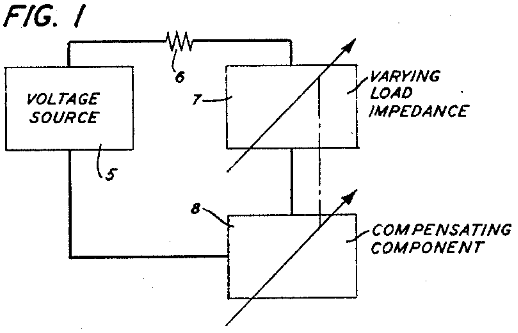
FIG. 1 is a block diagram illustrating the principles of operation of the circuits of this invention.

Referring now to FIG. 1 there is illustrated in block diagram form a circuit illustrating the manner of operation of the circuits of this invention. A voltage source 5 is connected to supply a voltage to a series circuit comprising a resistor 6, a varying load impedance 7 and a compensating component 8. Load impedance 7 is connected in relation to component 8 so that changes in voltage across impedance 7 produce equal but opposite changes in voltage across component 8. If at all times the voltage across component 8 remains equal to the voltage across the load impedance 7 but of opposite polarity thereto, the voltage across the resistor 6 remains constant at the value of voltage from source 5. Since resistor 6 is a linear device of constant value, if a constant voltage is maintained thereacross a constant current must necessarily pass therethrough. Thus the current to the load impedance 7 in series therewith must remain constant no matter how great the variance in load impedance 7 may be. It is obvious that a compensating device, component or circuit which will maintain a voltage in series with a varying load impedance equal but opposite to the voltage thereacross will, thus, provide a constant current to the varying load impedance.

Figure 2:
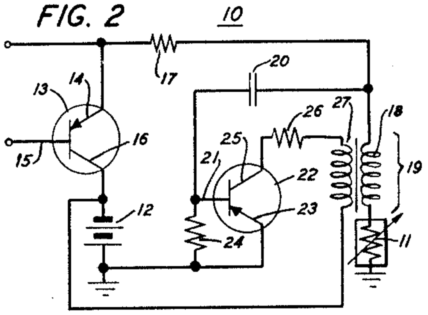
FIG. 2 is a schematic representation of a pulse generator circuit for regulating current pulses to a single varying load.

Referring now to FIG. 2 there is shown a constant current pulse generating circuit 10 adapted to provide a constant current pulse to a single varying load impedance 11. Circuit 10 comprises, in addition to load impedance 11, a source of negative potential 12 which is connected in series with the load impedance 11 by a transistor switch 13. Transistor switch 13 has an emitter terminal 14, a base terminal 15, and a collector terminal 16, which collector terminal 16 is connected directly to source 12. Switch 13 is adapted to connect the source 12 to load impedance 11 upon the advent of a potential difference between emitter terminal 14 and base terminal 15 from a source, not shown, such that emitter terminal 14 is positive with respect to base terminal 15. Switch 13 connects the source 12 to the impedance 11 through a resistor 17 and a secondary winding 18 of a transformer 19. The resistor 17 is directly connected to the emitter terminal 14 and is of a value of resistance large in comparison to any variations in load impedance 11 which are not compensated for by transformer 19 in the operation of circuit 10, which will be explained hereinafter. The secondary winding 18 is connected directly to load impedance 11 which is in turn connected to ground.

Load impedance 11 may be of any type which varies with time during the advent of a single pulse or from pulse to pulse. It is contemplated, however, that a significant advantage will be obtained from the circuits of this invention when impedance 11 comprises a magnetic core memory or logic array. For instance, impedance 11 may advantageously comprise advance windings serially connecting the cores of a magnetic core memory circuit wherein the number of switching cores may vary from pulse to pulse depending on the number of cores previously set.

Assuming that the input to each of the cores of the array is individually controlled and that any number of the total number of cores may be set, then the load impedance 11 may vary from that presented by a single core to that presented by any number of cores up to the total number in the array. The load impedance 11 varies in this manner because the windings on switching cores present a large impedance to current while windings on non-switching cores present a negligible impedance, as explained supra.

Basically, the operation of circuit 10 is as follows. Upon the advent of an appropriate potential between emitter terminal 14 and base terminal 15, the transistor 13 is switched on thus connecting the source 12 to the winding 18 and the load impedance 11. Connecting source 12 produces a large voltage across winding 18 negative at the top with respect to the bottom thereof, as viewed in the drawing. This negative voltage is applied through a capacitor 20 connected to winding 18 to a base terminal 21 of a transistor 22.

Transistor 22 has an emitter terminal 23 and a collector terminal 25 so connected and biased that the negative pulse at base terminal 21 initiates a base current thereat and causes transistor 22 to turn on and collector current to flow from collector terminal 25. Collector terminal 25 is connected through a resistor 26 to a primary winding 27 of the transformer 19 and current from the collector terminal 25 thus develops a voltage across winding 27. This voltage is coupled to winding 18 and appears in series with the load impedance 11 but is of opposite polarity to the voltage developed thereacross. The top of winding 18 is thus forced nearer ground until equilibrium is established such that the driving potential at the base terminal 21 of transistor 22 is just sufficient to generate the current necessary to produce a voltage across winding 18 approximately equal but opposite to the voltage across the load impedance 11. The driving voltage at base terminal 21 is proportional to the difference between the voltage across winding 18 and that across load impedance 11.

More specifically, when source 12 is connected to load impedance 11, the current which flows therethrough is controlled in value by winding 18. This current begins at zero and increases exponentially due to the inductance of winding 18. Since the current is changing most rapidly through winding 18 initially, a large negative voltage, mentioned supra, is created thereacross. Further, as the current through load impedance 11 is initially zero the voltage thereacross is also zero (considering that impedance 11 is a resistor) and the bottom of winding 18 is held at ground. The top of winding 18 thus is forced below ground to produce the negative pulse necessary to turn on transistor 22. If the impedance 11 is inductive (core windings), an initial negative voltage is produced thereacross also, providing further negative potential for turning on transistor 22.

The capacitor 20 through which the negative pulse is coupled to the base terminal 21 is of a value adequate to transfer the negative pulse with little or no appreciable distortion. Base terminal 21 is connected to ground through a resistor 24, and emitter terminal 23 is connected directly to ground. The negative pulse thus appears across resistor 24 and biases base terminal 21 correctly with respect to emitter terminal 23 for amplifier operation of transistor 22. Transistor 22 is advantageously of the p-n-p type and the biasing thereof for linear amplifier operation is completed by connecting collector terminal 25 through the resistor 26 and the primary winding 27 to the source of potential 12.

The configuration of circuit 10 is adapted in order that the time which it takes for current to reach its maximum level through transistor 22 upon receipt of a negative pulse at base terminal 21 is controlled by the rise time required for current through winding 27 of the transformer 19. Thus the value of potential across load impedance 11 will be established before transistor 22 has completed any appreciable portion of its turn-on.

The equilibrium condition wherein the voltage across the winding 18 is maintained approximately equal in value but of opposite polarity to the voltage across the load impedance 11 is established as follows. Transformer 19 is of a type having a high mutual inductance; and, thus, most of the energy provided at winding 27 is coupled to winding 18.

Because the load voltage is by this time established across load impedance 11, the difference between that load voltage and the voltage across winding 18 furnishes the pulse necessary to maintain the constantly increasing current from the collector terminal 25 of transistor 22 whereby the voltage is maintained across winding 27.

It is apparent that the voltage across winding 18 will remain approximately equal but opposite that across impedance 11 during the period of an input pulse at transistor 13. If the voltage across the winding 18 provided by transistor 22 rises to a point where it is greater than the voltage drop across load impedance 11, the potential supplied to the base terminal 21 tends to cut off transistor 22. As transistor 22 cuts off, the voltage across the winding 27 tends to reverse thus feeding back a negative pulse to base terminal 21 through winding 18 and turning transistor 22 on. In this manner transistor 22 is maintained at a point whereby the voltage across winding 18 is approximately equal but of opposite polarity to the voltage across load impedance 11. The constant voltage is maintained long enough for the pulse on transistor switch 13 to be removed and switching of the load impedance 11 to be completed.

By maintaining the voltage across winding 18 substantially equal, actually very slightly less, but of opposite polarity to that across load impedance 11, the top of winding 18 is maintained at approximately ground potential. Thus the portion of circuit 10 from ground through source 12, switch 13, and resistor 17 appears to be the complete circuit. As there is no variable element included in this portion of the circuit, the complete voltage from source 12 seems to be across resistor 17 at all times, and the current therethrough is constant. Since this current is constant, that delivered to the load impedance 11 must remain constant even though the load impedance 11 varies from pulse to pulse.

When the pulse across base terminal 15 and emitter terminal 14 of transistor switch 13 is removed, transistor switch 13 is placed in the high impedance state causing an effective open circuiting of the circuit including load impedance 11 and the winding 18. The change in current through winding 18 is such as to produce a large potential thereacross, positive at the top of winding 18 with respect to the bottom thereof, as viewed in the drawing. As current no longer flows in load impedance 11, no voltage is dropped thereacross and the bottom of winding 18 is at ground. The positive potential across winding 18 is thus relayed, in pulse form, through the capacitor 20 to the base terminal 21 of transistor 22. This positive pulse at base terminal 22 produces rapid turn-off of transistor 22 thereby allowing an increase in the repetition rate of input pulses by reducing the turn-off time.

Referring now to FIG. 3 there is shown a constant current pulse generating circuit 110. Circuit 110 is adapted to operate two or more independent varying load impedances. It is to be noted that circuit 110 operates only a single load impedance at any given time. Circuit 110 comprises two load impedances 111 and 131 which may be of any type which varies with time. For example, the impedances 111 and 131 might each comprise advance windings serially connecting an array of cores, which windings function to switch only cores which have been previously set.

Impedances 111 and 131 are each connected to ground. The end opposite ground of the impedance 111 is connected to an emitter terminal 114 of a transistor 113 also having a base terminal 115 and a collector terminal 116. The collector terminal 116 of the transistor 113 is in turn connected to one side of a secondary winding 118 of a transformer 119 which is of a type advantageously displaying a high degree of coupling between the various windings thereof. The transistor 113 is adapted to act as a switch to connect the impedance 111 to the secondary winding 118 upon the advent of a switching pulse to the transistor 113. For example, a potential from a source, not shown, provided between emitter terminal 114 and base terminal 115 in a manner to bias emitter terminal 114 positive with respect to base terminal 115 and of sufficient amplitude operates transistor 113. Operation of transistor 113 connects the impedance 111 to the winding 118.

To connect the terminal of the impedance 131 opposite ground to the secondary winding 118 of the transformer 119, a transistor 132 is employed. The transistor 132 has an emitter terminal 133 which is directly connected to the impedance 131, a base terminal 134, and a collector terminal 135 which is directly connected to the secondary winding 118. The transistor 132 operates in a manner identical to that of the transistor 113 to connect impedance 131 to winding 118 upon the advent of a potential from a source, not shown, which biases emitter terminal 133 positive with respect to base terminal 134. Transistors 113 and 132 are not operated in unison but are independently operated by some source or sources, not shown, such as, for instance, a multivibrator circuit. It is apparent that any number of load impedances can be connected to winding 118 in a manner identical to that in which impedances 111 and 131 are connected thereto.

Connected to the secondary winding 118 opposite the load impedances 111 and 131 is a resistor 117. The resistor 117 is adapted to correct for any minor errors realized in the operation of the circuit 110 of this invention, to be explained hereinafter, which are not completely corrected by various other means. The resistor 117 is connected to a source of negative potential 112 to provide a complete path to ground through impedances 111 or 131 upon the closing of either transistor switch 113 or 132.

Assuming that the load impedance 111 is connected to winding 118 by operating the transistor 113, current begins to flow. This current begins at an initial value of zero and increases exponentially due to the inductance of the winding 118 which allows no instantaneous current change therethrough. Since the current through impedance 111 increases exponentially, the load voltage thereacross increases in the same manner from an initial value of zero. However, initially the rate of change of current through winding 118 is greatest, and a large potential difference is produced in the winding 118 such that the bottom, as viewed in the drawing, is positive with respect to the top thereof. Due to the high degree of coupling between the windings of transformer 119, this voltage is coupled to another secondary winding 128. The winding 128 is connected to load impedance 111 through a diode 129 so that the voltage at the bottom of winding 128 is the same as the voltage at the load impedance 111, or initially zero. The voltage at the top of winding 128, however, differs therefrom by the voltage induced thereacross by winding 118. Winding 128 thus produces a negative potential which is coupled as a negative pulse through a capacitor 120 to a base terminal 121 of a transistor 122. Capacitor 120 is of a value such that it transfers the negative pulse created across the winding 128 of the transformer 119 with little or no appreciable distortion.

The transistor 122 includes an emitter terminal 123 and a collector terminal 125 in addition to base terminal 121 and is advantageously of the p-n-p junction type. The emitter terminal 123 is connected to ground and thence by a resistor 130 to the bottom of winding 128 to monitor load voltage changes. Emitter 123 is further connected by a resistor 124 to the base terminal 121 of transistor 122 so that the negative pulse received from the transformer 119 tends to bias the emitter terminal 123 positive with respect to the base terminal 121. It is well known that the rate of turn-on of a transistor varies with the value of the input but that there is a certain maximum input potential beyond which no increase in rate of turn-on is possible. The negative pulse, which is initially of a value much greater than is necessary to operate transistor 122 at its maximum turn-on rate, initiates a flow of base current thereby causing current to flow from ground through the emitter terminal 123 to the collector terminal 125. The collector terminal 125 is connected through a resistor 126 to a primary winding 127 of the transformer 119 and is adapted to produce a voltage thereacross upon the operation of transistor 122 in response to the voltage at base terminal 121. The winding 127 is connected to the source of negative potential 112 to complete the biasing of transistor 122.

The current through winding 127 produces a voltage thereacross which is coupled to winding 118 and is of a polarity opposite to that produced across winding 118 when load impedance 111 is first connected. As was mentioned supra pertaining to FIG. 2, the current increases through windings 118, 128 and 127 control those through the transistor 122, so that the maximum load voltage is established while transistor 122 is still turning on. Thus the potential at the bottom of winding 128 is established while transistor 122 is still turning on.

The opposing voltage changes affecting winding 128 cause the negative voltage fed back to the base 121 of transistor 122 to decrease until an approximately stable point is reached where the voltage across winding 118 is approximately equal and opposite to that across the load impedance 111. The voltage at the top of winding 128 decreases very slightly with respect to ground, just enough to cause transistor 122 to keep turning on at the same rate, as explained supra in reference to FIG. 2. The voltage at winding 127 is maintained constant by the very slightly increasing current therethrough.

In this manner, since the top of winding 118 remains essentially at ground throughout the length of an input pulse, the source of negative voltage 112 sees substantially no change in the impedance of the circuit 110 whether the load impedance 111 comprises a single core or a plurality of cores. As no change in total circuit impedance is noted, there is no change in current through load impedances 111 or 131 from pulse to pulse. Further, as most of the compensation is provided by transformer 119, the resistor 117 may be of a lower value of resistance than would be possible in a circuit wherein the total compensation was provided thereby since in circuit 110 resistor 117 needs only compensate for the small difference in the voltages across the winding 118 and the load impedance 111 or 131. Thus a much smaller resistor 117 may be employed than could be employed were the transistor feedback compensation absent.

The circuit for generating constant current pulses referred to above, may utilize a series operated transistor amplifier in lieu of the series resistance 117. The foregoing is possible because the voltage dropped across the transistor, which replaces the series resistor 117 of the previous circuit, needs to be less, by a large amount, than that in the prior art circuits since the transistor need compensate only for a small difference voltage, i.e., the small negative feedback pulse required to operate the transistor 122. Thus the circuit of this invention does not pose the limitation of various prior art circuits wherein the output voltage and the size of an array load depend on the amount of voltage drop that a series connected transistor can endure. The transistors 113 and 132 of FIG. 3 are operated as switches and have almost no drop thereacross while the transistor 122 of the compensating section of circuit 110 has no effect as to voltage except to produce a voltage in winding 127. The voltage induced in winding 118 by the transistor 122 may be increased to the desired amount by the simple method of adjusting the turns ratio of transformer 119 in the turns of windings 127 and 118.

Switching on transistor 132 to connect load impedance 131 to winding 118 operates circuit 110 in a like manner to connecting load impedance 111. Winding 128 is connected to impedance 131 through another diode 136 so that winding 128 and base terminal 121 monitor voltage changes across impedance 131.

When the transistor 113 is cut off to remove load impedance 111 from the circuit, the change in current through winding 118 produces a positive potential thereacross which is fed back through winding 128 and the capacitor 120 in the form of a positive pulse to base terminal 121 causing transistor 122 to turn off rapidly.

It is apparent that the circuits 10 and 110 described in FIG. 2 and FIG. 3, respectively, may be modified by those skilled in the art to operate in a like manner with slightly different circuitry. For instance, it might be desirable to insert the varying load impedance 11 or impedances 111 to 131 in the circuits comprising primary winding 27 or 127.

Referring now to FIG. 4, there is shown a comparison of current versus load impedances for circuit 10 of FIG. 2 and for the first mentioned prior art series resistor constant current generator. The dotted line illustrates current versus load impedance for the prior art circuit comprising a large resistance in series with a varying load while the solid line represents the characteristics of the circuit of FIG. 2 when the parameters of that circuit take the following illustrative values:

| | |
|---|---|
| Transistors **13, 22** | Western Electric 14A. |
| Winding **18** | 45 turns. |
| Winding **27** | 30 turns. |
| Input pulse | 0.4 $\mu$sec. |
| Resistor **17** | 47 ohms. |
| Resistor **26** | 10 ohms. |
| Potential at source **12** | 22.5 volts. |

It is apparent that the circuit of FIG. 2 presents an approximately constant current to a varying load for load changes from 0 to about 50 ohms while the prior art circuit presents very poor constancy for like percentage changes. For instance, assuming that the impedance presented to current through a single switching winding were approximately 10 ohms, the circuit 10 of FIG. 2 would provide a constant current pulse to the load impedance 11 whether a single one or five cores were switched at the same time. For the transistor 22 employed in the exemplary circuit, loads above 50 ohms cause saturation. Even so, if 12 cores are switched by the circuit 10, the current only drops by a value of approximately 20 percent and, though this drop affects switching time to some extent, still switches the proper cores if the switching pulses of the circuit are long enough. In the case of the prior art circuit, a change in the number of switching cores from one to five decreases the current by three-sevenths, and the switching time is appreciably affected. There is, in fact, some question whether the cores will actually switch, due to individual differences in characteristics thereof. Increasing the number of switching cores to twelve in the prior art circuit reduces the current by two-thirds, and the cores will no longer switch at all.

It is to be understood that the above described arrangements are illustrative of the application of the principles of this invention. Numerous other arrangements may be devised by those skilled in the art without departing from the spirit and scope of my invention.

What is claimed is:

1. A constant current pulse generator comprising in combination a transformer having a primary and a secondary winding; a series circuit connected to said secondary winding including a load impedance, and a resistor; a source of a direct-current potential; and transistor switching means for furnishing a pulse to said series circuit; and a transistor amplifier including a transistor having a base coupled to said secondary winding, a collector connected to said primary winding, and an emitter, and biasing means connected to said emitter whereby said amplifier is effective in response to a pulse from said potential source to induce a voltage across said secondary winding substantially equal and in opposition to the voltage across said load impedance.

2. A constant current pulse generator comprising in combination a load impedance which may vary from pulse to pulse; pulse source means in series with said load impedance including a source of direct-current potential, a resistor, and switching means; and feedback controlled amplifier means for furnishing a potential in series with said load impedance approximately equal in value but opposite in polarity to the potential across said load impedance whereby a constant voltage is maintained across said resistor, said amplifier means comprising a transformer having a primary and a secondary winding and a transistor having an input terminal and an output terminal, said secondary winding being connected in series with said varying load, said primary winding being connected to said output terminal of said transistor, and said input terminal being coupled to said load impedance and said secondary winding to provide a feedback path to monitor the potential across said secondary winding and said load impedance.

3. A constant current pulse generator comprising in combination a varying load impedance, a potential source, switching means for periodically connecting said source to said load impedance, means for supplying a voltage in series with said load impedance of a value substantially equal to the voltage across said load impedance but of an opposite polarity thereto in response to the continued connection of said source to said load impedance, and an impedance connected in series with said load impedance and said potential source.

4. A constant current pulse generator as in claim 3 wherein said means for supplying a voltage in series with said load impedance comprises a transformer having a secondary winding connected in series with said load impedance and said source, and a primary winding; and means for providing a constantly increasing current through said primary winding.

5. A constant current pulse generator as in claim 4 wherein said means for providing an increasing current through said primary winding includes an amplifier having input and output means, said input means coupled to said secondary winding, and said output means connected to said primary winding.

6. A constant current pulse generator as in claim 5 wherein said amplifier comprises a transistor operated in a linear portion of its operating range.

7. A constant current pulse generator as in claim 5 wherein said input means of said amplifier are capacitively coupled across said secondary winding and said load impedance to cause said amplifier to produce a voltage across said secondary winding in response to said changes.

8. A constant current pulse generator comprising a transformer having a primary and a secondary winding, load impedance which may vary between pulses connected in series with said secondary winding, a resistor connected in series with said secondary winding and said load impedance, means for supplying a pulse to said load impedance including a source of potential connected in series therewith, and means including said primary winding for providing a voltage across said secondary winding in response to the difference in voltages across said load impedance and said secondary winding substantially equal in value but opposite in polarity to any voltage appearing across said load impedance.

9. A constant current pulse generator as in claim 8 wherein said means for providing a voltage across said secondary winding comprises an amplifier including a transistor having a base, an emitter, and a collector terminal, said base and said emitter terminals being capacitively coupled to monitor the voltage across said secondary winding and said load impedance, said collector terminal being connected to said primary winding, and said amplifier being operative responsive to said difference in voltages to produce a voltage across said primary winding in opposition to the voltage across said load impedance.

10. A circuit for furnishing constant current pulses to a varying load impedance comprising in combination with said load impedance transformer means having at least two windings, one of said windings being arranged in series with said load impedance; means including a source of potential and a switch for supplying pulses to said load impedance; and feedback controlled amplifier means for furnishing a voltage to another of said windings of said transformer, said amplifier means having an input connected to said one of said windings.

11. An amplifier for furnishing a voltage in series with a varying load substantially equal in value but opposite in polarity to the voltage across said load whereby the current therethrough remains constant comprising coupling means connected to said load, and a transistor having a base, an emitter, and a collector electrode, said base and said emitter electrodes being capacitively coupled across said coupling means and said load to operate said transistor in response to variance in the voltage thereacross, said collector and emitter electrodes being connected to said coupling means to furnish a voltage thereacross.

12. A constant current pulse generator comprising in combination a plurality of varying load impedances, a transformer having a plurality of windings, switching means associated with each of said load impedances for individually connecting each of said load impedances to a first one of said windings, amplifier means having input means and output means, said input means being coupled to a second one of said windings, said output means connected to a third one of said windings, a resistor connected in series with said first winding, and a source of potential connected to said resistor and said amplifier means whereby connecting one of said loads to said first winding operates said amplifier to produce a voltage across said first one of said windings approximately equal but opposite in polarity to the voltage across said connected load impedance.

13. A circuit for furnishing constant current to a plurality of varying loads comprising in combination with said varying loads, means connecting said loads in parallel, a transformer having three windings, means for connecting a first one of said windings to each of said loads individually, a resistor in series with said first one of said windings, a voltage source connected to said resistor, and linear operated amplifier means having an input capacitively coupled to a second one of said windings and an output connected to a third one of said windings for furnishing voltages across said first one of said windings approximately equal to the voltage across said load but of opposite polarity thereto.

14. A pulse generator for supplying constant current pulses to varying load impedances comprising in combination therewith pulse source means including a first source of potential, transistor switching means for connecting said first source to said load impedances, and another impedance; and compensating means for maintaining current pulses to said load impedances of a constant amplitude comprising a transistor having a base, an emitter, and a collector, said emitter being connected resistively to said base and directly to a second source of reference potential, a transformer having at least three windings, a first one of said windings connected in series with said pulse source means, a second one of said windings connected by capacitive means to said base of said transistor, and a third one of said windings connected to said first source of potential and resistively to said collector of said transistor whereby a voltage substantially equal to the voltage across an operating one of said load impedances but of opposite polarity thereto is maintained across said first one of said windings, and diode means connecting said second one of said windings to said load impedances.

15. A circuit for providing rectangular current pulses of a predetermined amplitude to a magnetic core matrix load comprising in combination therewith a source of rectangular pulses, current-limiting means connected to said source, and means for furnishing a voltage in series with the load and said source which is substantially equal but of opposite polarity to the voltage across the load during the presence of a pulse from said source.

16. A circuit as in claim 15 wherein said last mentioned means includes a transformer having a first winding connected in series with the load and said source of pulses, and a second winding; and amplifier means for furnishing a current through said second winding to provide a substantially constant voltage across said first winding during the presence of a pulse from said source.

17. A circuit as in claim 16 wherein said amplifier means includes input means connected to measure the voltage across said first winding and said load, and output means connected to said second winding.

18. A circuit as in claim 17 wherein said amplifier means includes a transistor, and means biasing said transistor to amplify the voltage at said input means during the presence of a pulse from said source and to become inoperative in the absence of a pulse from said source.

References Cited in the file of this patent

UNITED STATES PATENTS

| | | |
|---|---|---|
| 2,570,015 | Loon et al. | Oct. 2, 1951 |
| 2,690,535 | Douma et al. | Sept. 28, 1954 |
| 2,818,544 | McCormack | Dec. 31, 1957 |
| 2,891,171 | Shockley | June 16, 1959 |